United States Patent [19]

Weiss et al.

[11] Patent Number: 4,600,236
[45] Date of Patent: Jul. 15, 1986

[54] DRIVER STATION FOR A VEHICLE

[75] Inventors: Heinz Weiss, Bensheim; Herbert Gelb, Hockenheim, both of Fed. Rep. of Germany

[73] Assignee: Deere & Company, Moline, Ill.

[21] Appl. No.: 692,150

[22] Filed: Jan. 17, 1985

[30] Foreign Application Priority Data

Jan. 30, 1984 [EP] European Pat. Off. ........ 84300574.5

[51] Int. Cl.$^4$ ............................................. B62D 33/06
[52] U.S. Cl. ............................... 296/190; 180/89.12; 280/756
[58] Field of Search .............................. 296/190, 102; 180/89.12; 280/756

[56] References Cited

U.S. PATENT DOCUMENTS

| 3,787,085 | 1/1974 | Bucher et al. | 296/190 |
| 3,802,530 | 4/1974 | Purcell et al. | 296/190 |
| 4,023,851 | 5/1977 | Palmer et al. | 296/190 |
| 4,050,733 | 9/1977 | Borrill | 180/89.12 |
| 4,135,756 | 1/1979 | Hansmann | 296/190 |

FOREIGN PATENT DOCUMENTS 1555915  7/1970  Fed. Rep. of Germany ...... 296/190

Primary Examiner—Robert R. Song

[57] ABSTRACT

The basic structure of the operator station comprises two transversely positioned U-shaped frames mounted by anti-vibration mountings on longitudinal frame members of a tractor and supporting a floor. The uprights of the U-shaped frames are interconnected by side panels formed at the top with mudguard flanges or fenders. The floor supports the driver's seat and a console, including steering wheel, pedals, etc. The basic, open driver station may be provided with a roll-over protection frame composed of further U-shaped frames oriented on their sides and fixed on top of the uprights of the main U-shaped frames. The further U-shaped frames are connectd by struts extending therebetween. A roof may be fitted on the further U-shaped frames. The station may be converted to an enclosed cab by adding a rear window, side windows and a wraparound windscreen incorporating a full height door of one side.

12 Claims, 3 Drawing Figures

4,600,236

DRIVER STATION FOR A VEHICLE

BACKGROUND OF THE INVENTION

The present invention relates to a driver station for a vehicle, such as a tractor or other agricultural or industrial vehicle. The driver station is of the type comprising a floor and sides and a console and seat for the driver mounted on the floor. The term "console" is used for convenience to denote the assemblage of controls used by the driver, including a steering wheel, levers and/or pedals and an instrument panel.

A driver station as defined above represents the basic structure used in a wide range of vehicles, although this basic structure may be supplemented to a greater or lesser extent by various other features. Thus, a driver station may range from a simple open station through a station with a roll-over protection frame to a station with at least a roof and ultimately an enclosed cab which can incorporate many of the refinements and comforts normally associated with private cars.

A problem existing with present designs is that they have evolved in a relatively arbitrary manner, particularly as the demands with respect to safety and comfort have become ever greater as the years have gone by. In consequence, the manufacturers of a wide range of vehicles is faced with high tooling costs to produce a multitude of parts individual to specific models, high stock inventory for manufacture and spares, and severe logistic problems in keeping proper control of the inventory and supplies to plants and agents.

SUMMARY OF THE INVENTION

The object of the present invention is to provide an improved driver station which in itself is a simple open station but which is capable of modular extension to various further levels of refinement. The invention will thus enable a manufacturer to reduce significantly his tooling and other manufacturing costs and the costs associated with inventory.

The invention is characterized by two longitudinally spaced, transversely disposed, upstanding U-shaped frames, with a floor supported on the base portions of the U-shaped frames, and two side panels connecting the limbs of the U-shaped frames on the two sides respectively.

The floor preferably comprises a corrugated sheet metal panel combining rigidity with lightness, with the corrugations running longitudinally. This panel is preferably clad on the top side with a smooth skin, preferably of rubber.

The side panels serve to stiffen the structure and, together with the upstanding limbs of the U-shaped frames, they provide a certain basic degree of protection for the driver. In addition, they may form the mudguards or fenders for wheels flanking the driver station, e.g. the large rear wheels of a tractor. To this end, the side panels can have out-turned top flanges constituting the mudguards or fenders.

The driver station according to the invention is adapted for use with a frame vehicle and the base portions of the U-shaped frames are preferably mounted on two longitudinal main frame members of the vehicle by way of resilient mountings giving some isolation against vibration and shock. In addition, an active damping device may be coupled between the driver station and the vehicle frame.

In order to combine strength with lightness, it is preferred to make the two U-shaped frames from metal tube, e.g. rectangular section tube.

In a first development of the invention, a roll-over protection frame may be built up on to the tops of the U-shaped frames. This is preferably achieved by means of two further U-shaped frames, one at each side, which have their limbs extending horizontally, namely a first limb connected to and spanning the tops of the two main U-shaped frame limbs on the corresponding side, and a second limb spaced above the first and forming the top, horizontal side of the roll-over protection frame. The base portion of each further U-shaped frame forms an upward prolongation or extension of one of the main U-shaped frame limbs on the corresponding side, preferably the rear main U-shaped frame The roll-over protection frame may be completed by various struts, especially transverse horizontal struts, e.g., at the front and/or rear ends of the upper, second limbs of the further U-shaped frames, and/or at the tops of the limbs of the rear main U-shaped frame (i.e. behind the driver's seat). Vertical struts may span the limbs of each further U-shaped frame in prolongation of the limbs on the front main U-shaped frames.

The upper, second limbs of the further U-shaped frames are preferably prolonged forwardly so as to extend over the console. In order to give basic protection against the weather, a roof may be fitted over the upper, second limbs of the further U-shaped frames.

In order to construct a completely enclosed cab, it suffices to put windows in the side and rear openings defined by the main and further U-shaped frames and panel in the front of the station, wholly in window material or partially in such material and partially in sheet metal panels. The panels will incorporate a door on one side, at least, with a standard rising from the floor to the roll-over protection frame to provide a door post.

With an enclosed cab, it becomes feasible to add such features as heating, air conditioning, a radio, a deluxe upholstered seat, and so on.

With a framed vehicle, it is not necessary for the driver station to participate in structural integrity, beyond meeting its own requirements for drive protection, including roll-over protection. The driver station can therefore be relatively light. The main U-shaped frames connected by the floor and side panels form a structural cell of considerable rigidity and it is therefore possible to dispense with special supporting brackets. That is, simple anti-vibration mountings (an elastromeric body bonded between two metal parts) of the type widely used in vehicles can be used. This combines cheapness with the benefit of a basic degree of isolation from shocks for the driver.

The invention will now be described in more detail, by way of example, with reference to the accompanying drawings.

DESCRIPTION OF THE PREFERRED EMBODIMENT

Figure 1:
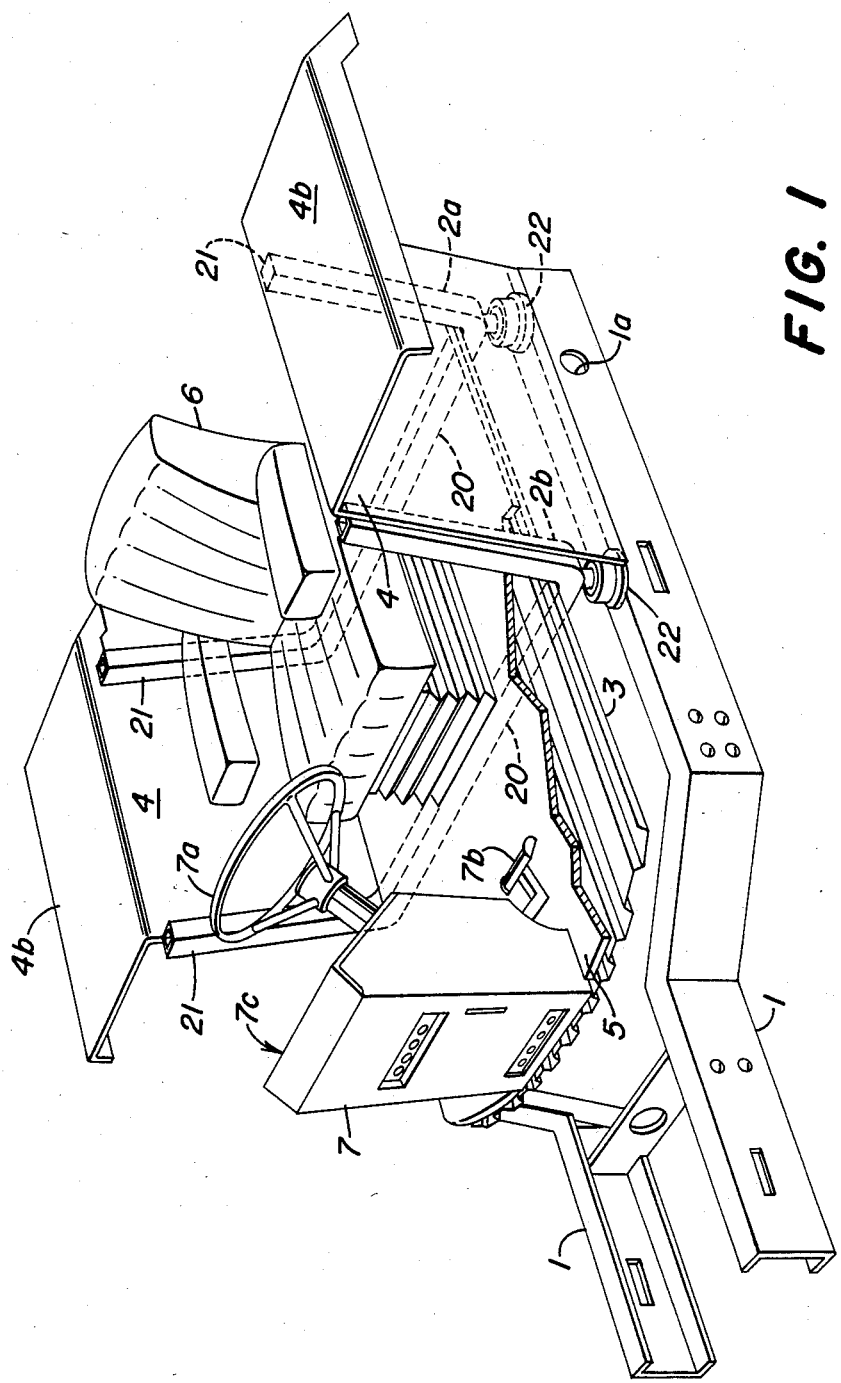
FIG. 1 is a perspective view of a basic driver station embodying the invention.

Referring to FIG. 1, a tractor is represented solely by two longitudinal frame members 1 formed of stout channel section girders cranked out at the rear to provide a wide support base for the driver station. Towards the rear, each frame member 1 has a hole 1a to accommodate the corresponding rear wheel axle.

The driver station is formed structurally by a rear U-shaped frame 2a, a front U-shaped frame 2b, a floor 3 and side panels 4. The U-shaped frames 2a and 2b are fabricated from rectangular section steel tube and each frame has a flat base portion 20 extending transversely across the width of the tractor so that the limbs 21 of the U-shaped frames stand up at the sides of the tractor. Each base portion 20 is supported at each end on the corresponding longitudinal frame 1 by way of a resilient, anti-vibration mounting 22.

The floor 3 is essentially flat but is formed of corrugated steel sheet with the corrugations running longitudinally to provide adequate rigidity. The corrugated floor panel is covered with a smooth skin 5, preferably of rubber.

The side panels 4 are likewise steel sheets which are preferably welded to the upright limbs 21 of the U-shaped frames and may be stiffened by embossed ribs. Moreover, each side panel 4 is provided at the top with an out-turned flange 4b which forms a mudguard or fender for the corresponding large rear wheel.

Towards the rear of the floor 5 there is mounted a driver's seat 6 while, at the front, there is disposed a console 7 with the steering wheel 7a, pedals 7b, an instrument panel 7c and possibly other devices.

The driver station of FIG. 1 is open but already provides a fair degree of protection by virtue of the upright limbs 21 at the sides, interconnected by the panels 4. The station forms a very rigid cell because the U-shaped frames 2a and 2b lying in transverse vertical planes are rigidly connected by the side panels 4 lying in longitudinal vertical planes and by the floor 3 lying in a horizontal plane.

Figure 2:
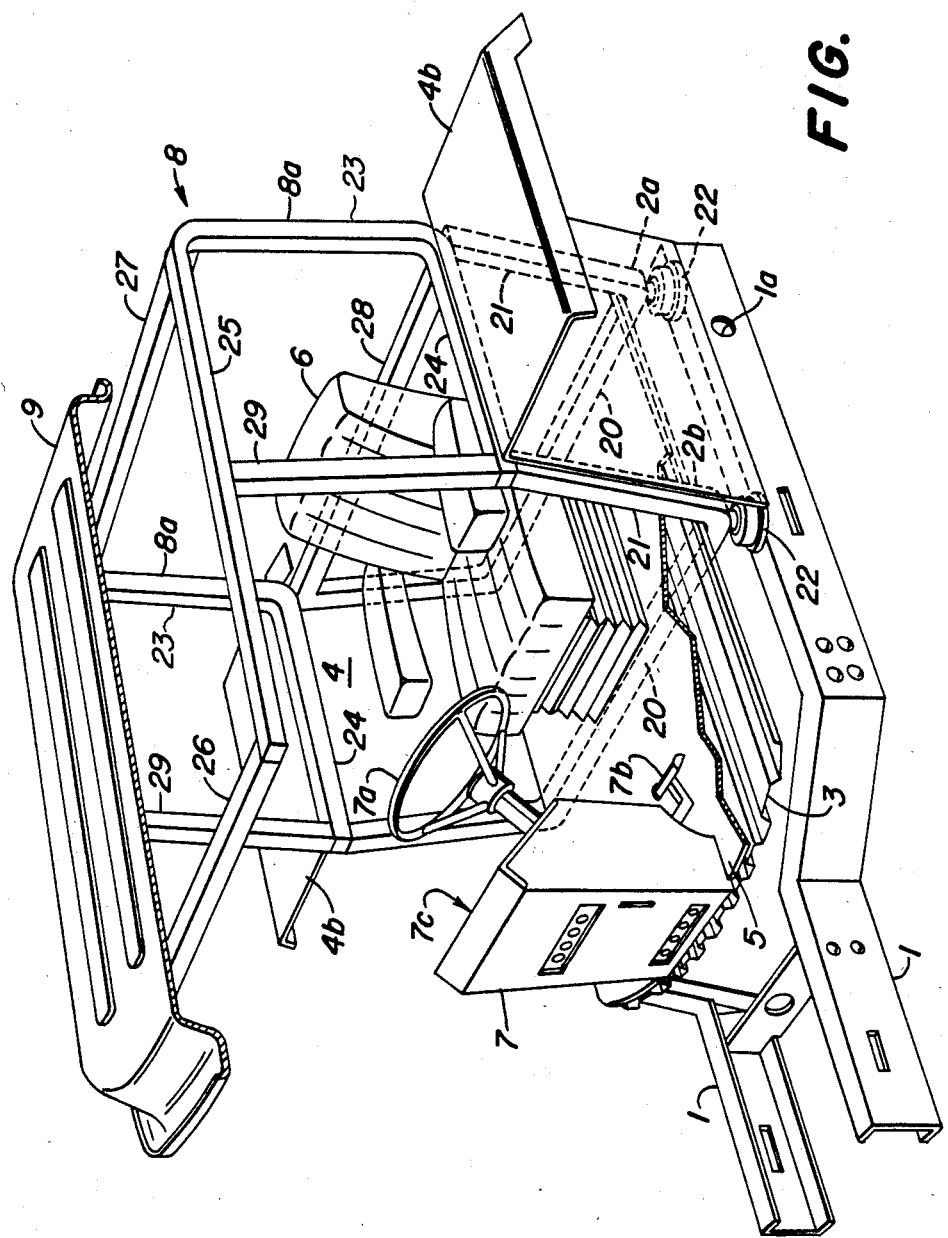
FIG. 2 is a similar view of the station with an added roll-over protection frame and simple roof.

FIG. 2 shows exactly the same driver station supplemented by further parts to provide a complete roll-over protection frame 8 on which a simple roof 9 may be mounted. The roll-over protection frame 8 is formed primarily by two further U-shaped frames 8a, but lying on their sides so that the base portions 23 of these frames are vertical while first, lower limbs 24 and second, upper limbs 25 are horizontal. Referring to one frame 8a, the lower horizontal limb 24 extends between the tops of the limbs 21 of the main U-shaped frames on the corresponding side of the vehicle. The base portion 23 extends vertically in upward prolongation of the rear limb 21 of the main frame 2a. The upper horizontal limb 25 is longer than the lower limb 24 and carries forward over the front limb 21 of the frame 2b and beyond, to the front of the floor 3. An upright strut 29 extends between the horizontal limbs 24 and 25 in prolongation of the front limb 21 of the frame 2b.

Three transverse struts are provided between the further U-shaped frames 8a, namely a front top strut 26, a rear top strut 27 and a rear, lower strut 28 which is at the level of the tops of the limbs 21 of the main U-shaped frames 2a and 2b. The roof 9 is of sheet metal and sits on the rectangular frame formed by the upper horizontal limbs 25 and the front and rear struts 26 and 27 extending therebetween. All of the U-shaped frames and struts are welded together to provide a strong yet relatively light roll-over protection frame. Like the frames 2a and 2b, the frames 8a and the struts 26 to 29 may be formed of tubular metal, preferably of rectangular section.

Figure 3:
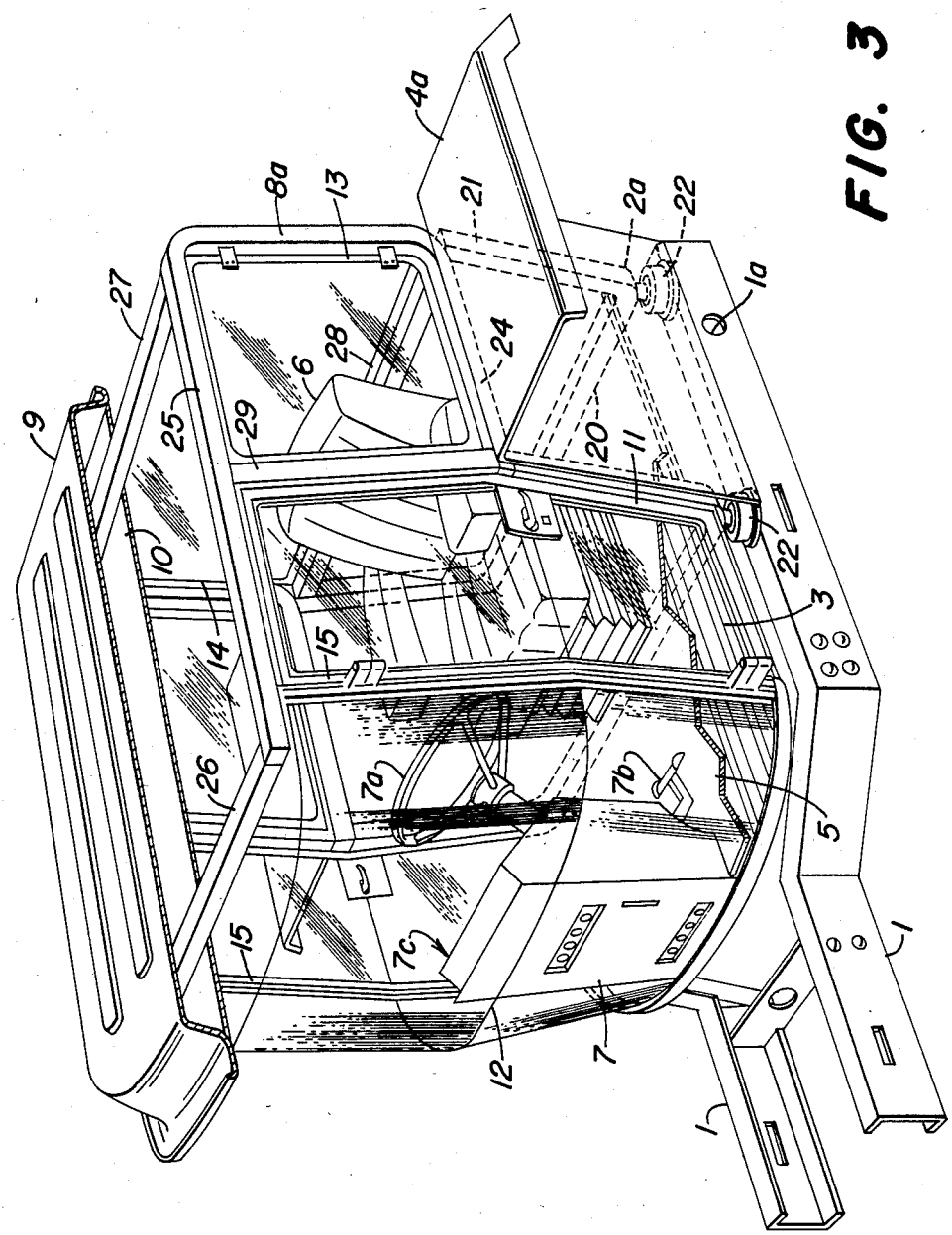
FIG. 3 is a similar view of the station provided with windows and a door to form a completely enclosed cab.

The station of FIG. 2 may be converted to a completely enclosed cab in the manner illustrated in FIG. 3. The essential parts are an inner ceiling panel 10, a door 11, a windscreen 12, side windows 13 and a rear window 14. The rear window 14 may extend from ceiling to floor or only down as far as the transverse strut 28, with an obscure panel (e.g. sheet metal) from the strut 28 down to the floor. The side windows 13 fill in the U-shaped frames 8a and 8b above the side panels 4.

In order to provide adequate support for the windscreen 12 and more particularly to provide a door post for the door 11, two standards 15 extend from the front corners of the floor 3 up to the front ends of the upper horizontal limbs 25 of the roll-over frames 8a. As illustrated, a full height door 11 may be hinged on the standard 15 on one side of the vehicle. The windscreen 12 may, as illustrated, be a floor to ceiling, wraparound windscreen. Equally, it is obviously possible to glaze areas separately or employ obscure panels in lower parts.

Having thus described preferred embodiments of the invention, various modifications thereof which can be made without departing from the underlying principles of the invention will become apparent to those skilled in the art. Therefore, the invention should not be limited by the specific illustrations and descriptions, but only by the scope and spirit of the following claims.

We claim:

1. A driver's station adapted to be mounted on a vehicle for supporting a control console and a driver's seat, said station comprising: first and second spaced-apart U-shaped frames, each having a base portion adapted to extend transversely on the vehicle when the station is mounted on the vehicle and first and second upstanding limbs; first and second side panels, the first side panel extending between and secured to the first limbs of the first and second U-shaped frames and the second side panel extending between and secured to the second limbs of the first and second U-shaped frames; and a floor supported on the base portions of the U-shaped frames between the limbs thereof.

2. A driver station according to claim 1, characterized in that the first and second U-shaped frames are made from metal tube.

3. A driver station according to claim 2, characterized in that the floor comprises a corrugated sheet metal panel, with the corrugations running perpendicular to the base portions of the first and second U-shaped frames.

4. A driver station according to claim 3, characterized in that the corrugated panel is clad on the top side with a smooth skin.

5. A driver station according to claim 4, characterized in that the side panels have out-turned top flanges forming fenders adapted to extend over the wheels of the vehicle when the station is mounted on a vehicle.

6. A driver station according to claim 2, characterized by a roll-over protection frame built-up on the tops of the first and second U-shaped frames, the roll-over protection frame comprising third and fourth U-shaped frames each having a base portion and first and second limbs with the base portion extending generally vertically and the limbs extending generally horizontally, the third U-shaped frame having its first limb connected to and spanning the tops of the first limbs of the first and second U-shaped frame and its second limb spaced above the first and forming a top side of the roll-over protection frame, the fourth U-shaped frame having its first limb connected to and spanning the tops of the second limbs of the first and second U-shaped frames and its second limb spaced above the first and forming an additional top side of the roll-over protection frame.

7. A driver station according to claim 6, characterized in that the base portions of the third and fourth U-shaped frames form upward prolongations of the first and second limbs, respectively, of the first U-shaped frame.

8. A driver station according to claim 7, characterized in that the roll-over protection frame further comprises horizontal struts connected to and spanning the free ends of the second limbs of the third and fourth U-shaped frames, the upper ends of the first and second limbs of the first U-shaped frame, and the third and fourth U-shaped frames at approximately the junctures of the base portions and second limbs.

9. A driver station according to claim 8, further characterized in that vertical struts are connected to and span between the limbs of the third and fourth U-shaped frames in prolongation of the first and second limbs of the second U-shaped frame.

10. A driver station according to claim 9, characterized in that the floor extends from the base portion of the first U-shaped frame to the base portion of the second U-shaped frame and includes a portion extending beyond the base portion of the second U-shaped frame adapted to support a control console, and the upper, second limbs of the third and fourth U-shaped frames are prolonged forwardly so as to carry right over the portion of the floor adapted to support the console.

11. A driver station according to claim 10, characterized by a roof fitted over the upper, second limbs of the third and fourth U-shaped frames.

12. A driver station according to claim 11, characterized in that a standard rises from the floor to the roll-over protection frame adjacent to the free end of at least one of the second limbs of the third and fourth U-shaped frames to provide a post supporting a door, and the side and rear openings defined by the U-shaped frames and the front of the station are enclosed to provide an enclosed environment for an operator.

* * * * *